United States Patent [19]

Gotou

[11] Patent Number: 4,527,102
[45] Date of Patent: Jul. 2, 1985

[54] DRIVE SYSTEM FOR A DC MOTOR WITH REDUCED POWER LOSS

[75] Inventor: Makoto Gotou, Nishinomiya, Japan

[73] Assignee: Matsushita Electric Industrial Co., Ltd., Kadoma, Japan

[21] Appl. No.: 518,284

[22] Filed: Jul. 28, 1983

[30] Foreign Application Priority Data

Jul. 31, 1982 [JP] Japan .................................. 57-13401
Aug. 2, 1982 [JP] Japan ................................. 57-135345
Aug. 2, 1982 [JP] Japan ................................. 57-135346

[51] Int. Cl.³ .............................................. H02P 6/02
[52] U.S. Cl. .................................... 318/254; 318/439; 323/207; 363/19
[58] Field of Search ................... 318/138, 439, 254 A, 318/254; 323/207, 282; 363/15, 16, 19, 23, 25, 26, 28

[56] References Cited

U.S. PATENT DOCUMENTS

| | | | |
|---|---|---|---|
| 3,839,668 | 10/1974 | Black | 363/23 |
| 3,978,393 | 8/1976 | Wisner et al. | 363/19 X |
| 4,035,700 | 6/1977 | Kawasaki et al. | 318/138 |
| 4,070,606 | 1/1978 | Morozumi et al. | 318/138 X |
| 4,146,832 | 3/1979 | McConnell | 363/19 X |
| 4,250,435 | 2/1981 | Alley et al. | 318/439 X |
| 4,359,674 | 11/1982 | Gotou | 318/318 |

FOREIGN PATENT DOCUMENTS

| | | | |
|---|---|---|---|
| 64711 | 6/1978 | Japan | 318/138 |
| 3590 | 1/1982 | Japan | 318/138 |
| 57-132763 | 8/1982 | Japan | 363/15 |
| 743128 | 6/1980 | U.S.S.R. | 318/138 |

OTHER PUBLICATIONS

IBM Technical Disclosure Bulletin, "DC to DC Converter", vol. 6, No. 10, pp. 30–31, Mar. 1964.

Primary Examiner—Vit W. Miska
Assistant Examiner—Bentsu Ro
Attorney, Agent, or Firm—Wenderoth, Lind & Ponack

[57] ABSTRACT

A high power efficiency drive system for a DC motor which controls the supply of power to polyphase coils has a DC-DC switching converter for changing an output voltage according to an ON-time ratio of the switching transistor, and a switching controller for controlling the ON-time ratio of the switching transistor. The DC-DC switching converter includes a switching transistor for chopping the voltage of a DC voltage source, a filter for smoothing the output voltage of the switching transistor, and a current amplifier for supplying the switching transistor with a base current pulse having a magnitude proportional to an input current. The switching controller controls the operation of the current amplifier for producing the base current pulse of the switching transistor. The system further includes a current detector for detecting the current to the polyphase coils, a current supplier for supplying the current amplifier with the input current corresponding to the detected signal from the current detector, so that the base current of the switching transistor at the ON-time changes corresponding to the current to the polyphase coils.

20 Claims, 3 Drawing Figures

DRIVE SYSTEM FOR A DC MOTOR WITH REDUCED POWER LOSS

BACKGROUND OF THE INVENTION

1. Field of the Invention

This invention relates to a drive system for a DC motor, and more particularly, to a drive system for a DC motor with reduced power loss.

2. Description of the Prior Art

In a conventional system, when controlling the rotational speed of a DC motor, a drive transistor is used to supply the DC motor with a controlled voltage from a DC voltage source. The drive transistor controls the electrical power to the DC motor by changing the voltage drop between the collector and emitter terminals. In this case, the supplied power from the DC voltage source is the sum of the effective power in the DC motor and the power loss (the collector loss) of the drive transistor. The power loss of the drive transistor is generally larger than the effective power in the DC motor.

Accordingly, the power efficiency, defined as the percent ratio of the effective power supplied to the DC motor to the total power supplied from the DC voltage source, is rather small. Particularly, in a control system for a DC motor having a wide range of rotational speeds or output torque, the power efficiency becomes remarkably small at low speed or low torque. (For example, a capstan motor for an audio or video cassette tape recorder has to rotate in a wide range of rotational speeds from low speed in its play mode to high speed in its cue mode, and its power efficiency is about 20% in its play mode.)

U.S. Pat. No. 4,359,674 discloses a control system for a DC motor having a DC-DC switching converter in order to improve the power efficiency. When such a control system for a DC motor is used for controlling the rotational speed, the current to the polyphase coils at the starting or acceralating period is large enough to acceralate the DC motor rapidly. But the current to the polyphase coils at the controlled period becomes small corresponding to a small load torque. For example, the current to the polyphase coils is 2 A at the starting period but 250 mA at the controlled period.

The DC-DC switching converter supplies the polyphase coils with the above current through a switching transistor. So, the base current of the switching transistor has to be large enough to deal with the current 2 A at the starting period.

Assuming that current gain $h_{FE}$ of the switching transistor is 50 and that overdrive factor of the switching transistor is 2, the necessary base current of the switching transistor is at least $(2\ A/50)\times 2 = 80$ mA at the starting period. The overdrive factor is defined as ratio of the actual base current of the switching transistor to the minimum base current $I_c/h_{FE}$ to flow the collector current $I_c$. On the other hand, the necessary base current of the switching transistor at the controlled period is only $(250\ mA/50)\times 2 = 10$ mA corresponding to the current 250 mA.

Thus, the excess base current, $80\ mA - 10\ mA = 70$ mA, causes a power loss, which decreases the power efficiency. Assuming that the voltage of the DC voltage source and the output voltage of the DC-DC switching converter are 20 V and 7 V, respectively, the power loss is about $20\ V\times 70\ mA\times 0.35 = 0.49$ W, where 0.35 is the ON-time ratio of the switching transistor, defined as ratio of ON-time to one cycle time.

The power supplied to the DC motor is $7\ V\times 250\ mA = 1.75$ W, thus the power loss 0.49 W of the excess base current is equal to 28% of the effective power 1.75 W. As the DC motor usually rotates at the controlled rotational speed, the above power loss has to be reduced for improving the power efficiency.

SUMMARY OF THE INVENTION

Accordingly, an object of the present invention is to provide a drive system for a DC motor with reduced power loss, which is suitable for a DC motor having a wide range of rotational speeds or output torque.

It is another object of the present invention to provide a drive system for a brushless DC motor with reduced power loss.

It is a further object of the present invention to provide a DC-DC switching converter with reduced power loss usable for a drive system for a DC motor.

These objects are achieved according to the present invention by providing a DC-DC switching converter having a switching transistor for chopping the voltage of a DC voltage source, a filter for smoothing the output voltage of said switching transistor, and a current amplifier for supplying said switching transistor with a base current pulse having a magnitude propotional to an input current; a switching controller controlling the operation of said current amplifier for making the base current pulse of said switching transistor; a current detector for detecting the current to the polyphase coils; and a current supplier supplying said DC-DC switching converter with the input current corresponding to the detected signal of said current detector so that the base current of said switching transistor at the ON-time changes corresponding to the current to said polyphase coils.

BRIEF DESCRIPTION OF THE DRAWINGS

These and other objects, features and advantages of the present invention will become more apparent from the following detailed description taken with the accompanying drawings in which.

DESCRIPTION OF THE PREFERRED EMBODIMENTS

Figure 1:
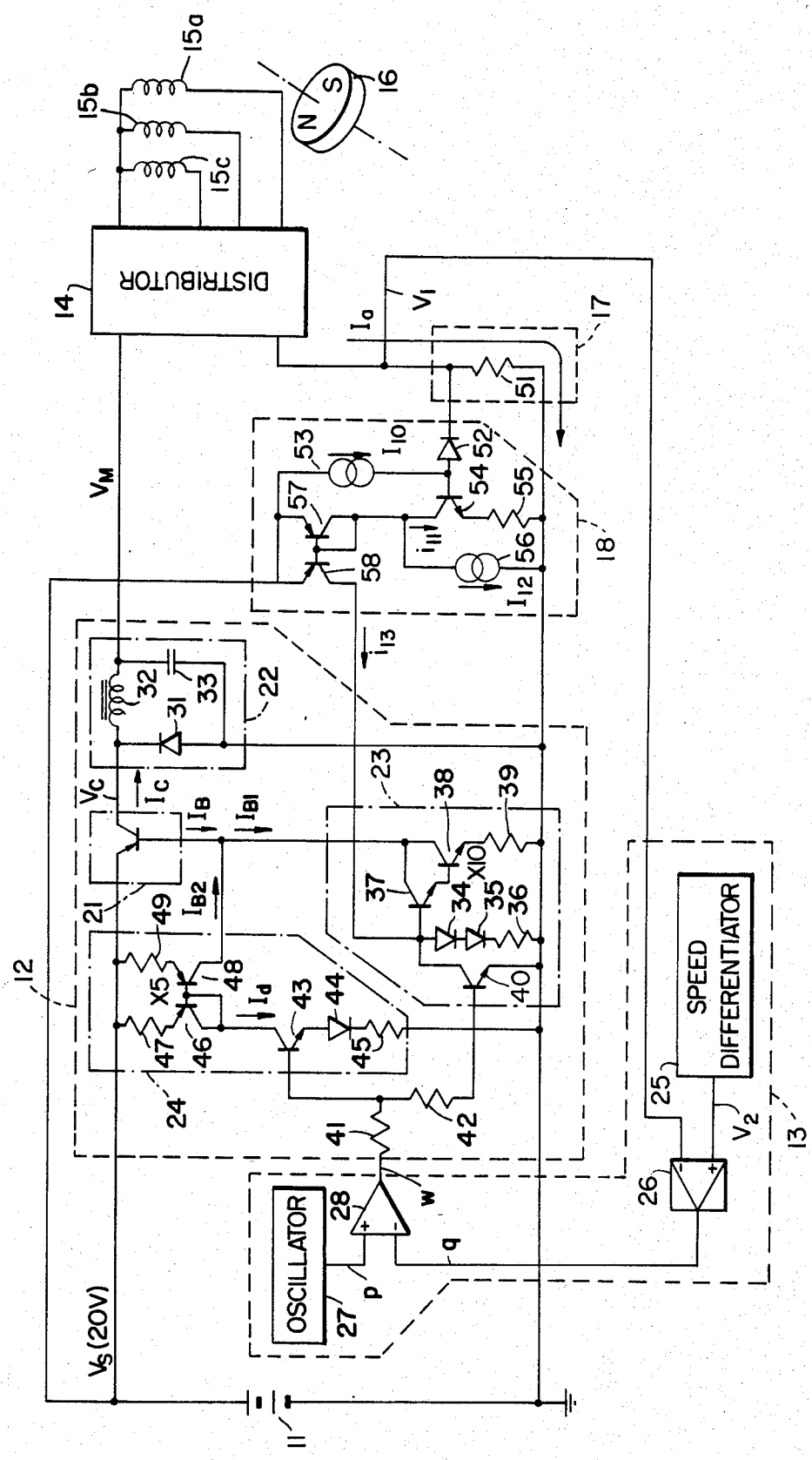
FIG. 1 is a circuit diagram of an embodiment of a drive system for a DC motor according to the present invention.

Referring now to FIG. 1, which is an embodiment of the present invention, a DC-DC switching converter 12 is coupled to a DC voltage source 11 and produces another voltage $V_M$ from the voltage $V_S$ ($V_S = 20$ V) of the DC voltage source 11 according to the ON-time ratio of a switching transistor 21. A distributor 14 distributes the output current of the DC-DC switching converter 12 to polyphase coils 15a, 15b and 15c according to the relative position between the polyphase coils and a permanent magnet 16. The permanent magnet 16 has a plurality of N and S poles and the polyphase coil 15a, 15b and 15c are provided in the magnetic field of the permanent magnet 16. So, the interaction between the currents through the polyphase coils 15a, 15b and 15c and the magnetic field of the permanent magnet 16 generates a force to drive a rotor of the DC motor continuously. The rotor of the DC motor is the polyphase coils 15a, 15b and 15c mounted on an armature core when the distributor 14 is a mechanical commutator. The rotor of the DC motor is the permanent magnet 16 when the distributor 14 is an electronic commutator comprising a position detecting means and semiconductor switches. The DC motor comprises the polyphase coils 15a, 15b and 15c and the permanent magnet 16.

The current $I_a$ to the polyphase coils 15a, 15b and 15c is detected by the voltage drop $V_1$ across a resistor 51 of a current detector 17. Neglecting a constant current $I_{10}$ ($I_{10}=0.5$ mA), which is much smaller than $I_a$, $$V_1 \approx R_{51} \cdot I_a \qquad (1)$$

where $R_{51}$ is the resistance value of the resistor which is 51, usually much smaller than the resistance values of the polyphase coils. In this case, $R_{51}=0.1\Omega$ for reducing the Joule loss.

Figure 2:
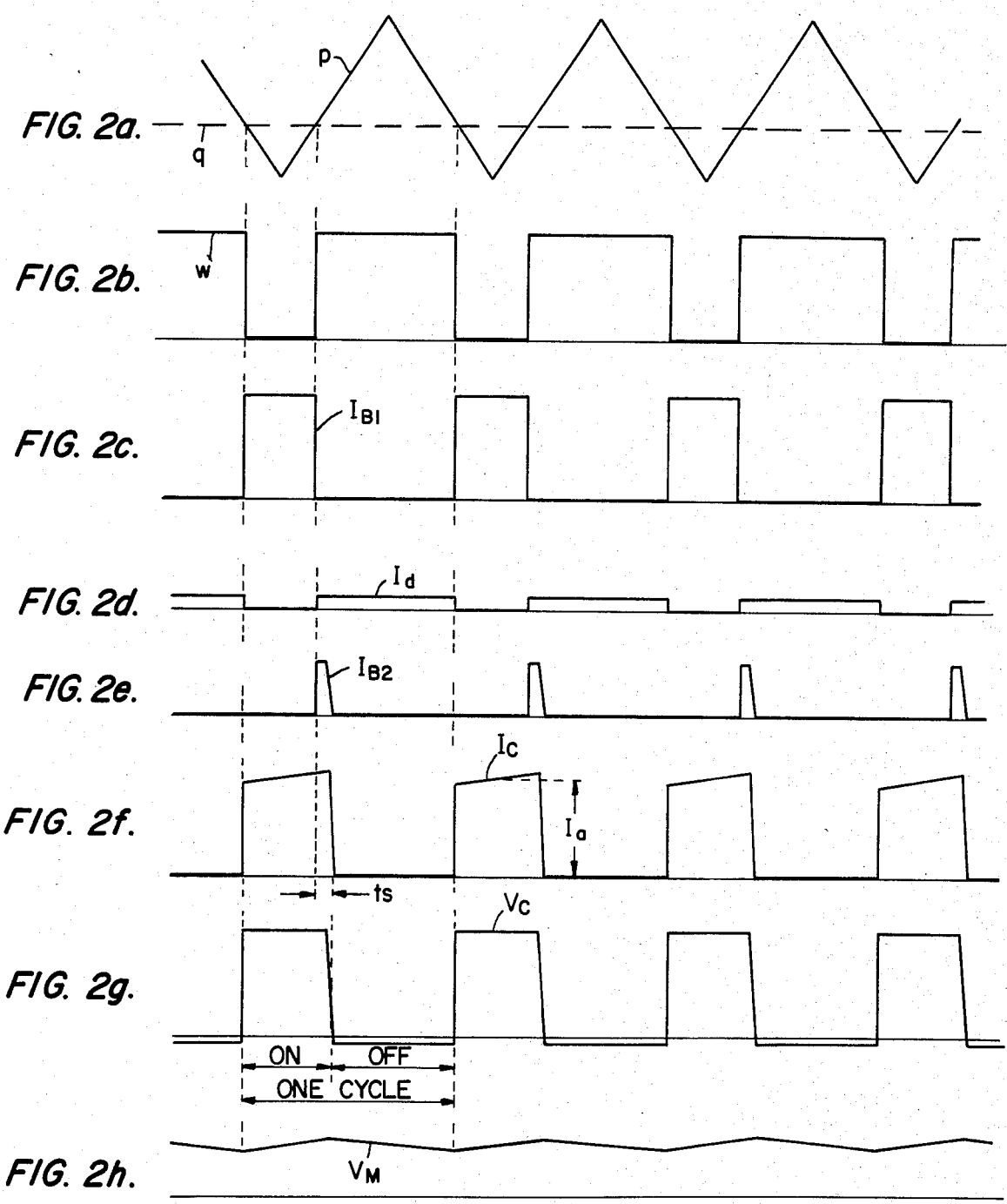
FIG. 2 shows waveform charts for explaining the operation of the embodiment shown in FIG. 1.

The output of the current detector 17 is coupled to the inverting terminal of a differential amplifier 26 of a switching controller 13, and the output of a speed differentiator 25 is coupled to the non-inverting terminal of the differential amplifier 26. The speed differentiator 25 produces an output voltage $V_2$ corresponding to the difference between the rotational speed of the DC motor and the desired rotational speed. The differential amplifier 26 amplifies the voltage difference ($V_2-V_1$) by a predetermined gain. A comparator 28 compares the output voltage q of the differential amplifier 26 with a triangle-wave signal p of about 100 KHz supplied from an oscillator 27. The output signal w of the comparator 28 is zero or a low level when q>p, and w is $V_S$ or a high level when q<p. Therefore, the comparator 28 produces a PWM signal (Pulse Width Modulated signal), the pulse width of which is corresponding the difference ($V_2-V_1$). The PWM signal w of the switching controller 13 remains zero when $V_2>>V_1$. The relationships among the signals p, q and w is shown in FIGS. 2a and 2b.

A current supplier 18 is coupled to the output $V_1$ of the current detector 17. The constant current source 53, the diode 52, the transistor 54 and the resistor 55 produces a current $i_{11}$ propotional to the current $I_a$ to the polyphase coils 15a, 15b and 15c. Because the voltage drop across the diode 52 is equal or nearly equal to the base-emitter voltage $V_{BE}$ of the transistor 54, the voltage drop across the resistor 55 is equal or nearly equal to the output $V_1$ of the current detector 17. Thus, $$i_{11} \approx (V_1)/(R_{55}) = (R_{51}/R_{55}) \cdot I_a \qquad (2)$$

where $R_{55}$ is the resistance value of the resistor 55 and is much larger than $R_{51}$, usually $R_{55} \geq 100 \cdot R_{51}$. In this case, $R_{55}=100\Omega$, then $i_{11}=I_a/1000$.

The current $i_{11}$ is added to the constant current $I_{12}=0.1$ mA of a current source 56, and the added current ($i_{11}+I_{12}$) is supplied to the DC-DC switching converter 12 through a current mirror of transistors 57 and 58. Thus, the output current $i_{13}$ of the current supplier 18 is, $$i_{13} = i_{11} + I_{12} \qquad (3)$$

A current amplifier 23 of the DC-DC switching converter 12 has a current mirror circuit formed by diodes 34 and 35, transistors 37 and 38, and resistors 36 and 39, which amplifies the input current $i_{13}$ from the current supplier 18 and serves the amplified current $I_{B1}$ to the base of the switching transistor 21. Because the voltage drop across the diodes 34 and 35 is equal or nearly equal to the base-emitter voltage of the composite transistor (transistors 37 and 38), the voltage drop across the resistor 39 is equal or nearly equal to the voltage drop across the resistor 36. Thus, when w=0, $$I_{B1} \approx (R_{36}/R_{39}) \cdot i_{13} \qquad (4)$$

where $R_{36}$ and $R_{39}$ are the resistance values of the resistors 36 and 39, respectively. $R_{36}/R_{39}$ is equal to 40 in the embodiment. The mark ×10 below the transistor 38 means that the cell size of the transistor 38 is as large as 10 times of that of the usual transistor or diode (transistor 37, diode 34 or 35). As the switching controlled 13 controls a transistor 40 of the current amplifier 23 to chop the current $I_{B1}$, the base current $I_{B1}$ of the switching transistor 21 is a current pulse having a magnitude propotional to the input current $i_{13}$. That is, $$I_{B1} = \begin{cases} \left(\dfrac{R_{36}}{R_{39}}\right) \cdot i_{13} & \text{when } w = 0 \qquad (5a) \\ 0 & \text{when } w = V_S \qquad (5b) \end{cases}$$

The waveform of $I_{B1}$ is shown in FIG. 2c.

The switching controller 13 also controls a discharger 24. When w=$V_S$ (high level), the discharger 24 produces a constant current $I_d$ (about 1 mA) at the collector of the transistor 43. The current $I_d$ is chiefly determined by the resistance value of the resistor 45 when the resistance values of the resistors 41 and 42 are equal. Transistors 46 and 48 and resistors 47 and 49 form a current mirror amplifier. The cell size of the transistor 48 is larger than that of the transistor 46 by 5 times, and the resistance values of the resistors 47 and 49 are 100$\Omega$ and 20$\Omega$, respectively. So, the constant current $I_d$ is amplified by 5 times, and the output transistor 48 of the current mirror amplifier makes a short circuit between the base and emitter of the switching transistor 21. The output current $I_{B2}$ of the discharger 24 is $5 \cdot I_d$, when the base-emitter charge of the switching transistor 21 is large. But $I_{B2}$ decreases according to the decrease of the base-emitter charge. When the output w of the switching controller 13 turns zero (low level), the current $I_d$ becomes zero and the output current $I_{B2}$ of the discharger 24 is zero. The waveforms of $I_d$ and $I_{B2}$ are shown in FIGS. 2d and 2e.

The current amplifier 23 and the discharger 24 operate complementally according to the output w of the switching controller 13. Thus, the base current $I_B$ of the switching transistor 21 is, $$I_B = I_{B1} - I_{B2} = \begin{cases} \left(\dfrac{R_{36}}{R_{39}}\right) \cdot i_{13} & \text{when } w = 0 \qquad (6a) \\ -I_{b2} & \text{when } w = V_S \qquad (6b) \end{cases}$$

As the result of this, the ON-time ratio of the switching transistor 21 is controlled by the switching controller 13 precisely. The collector current $I_c$ and the collector voltage $V_C$ of the switching transistor 21 are shown in FIGS. 2f and 2g.

A filter 22 changes the voltage pulse $V_C$ of the switching transistor 21 to the DC voltage $V_M$, which is corresponding to the ON-time ratio of the switching transistor 21. When the switching transistor 21 turns ON (saturated), $V_C \approx V_S$, and the DC voltage source 11 supplies electrical power to an inductor 32, a capacitor 33 and the distributor 14. When the switching transistor 21 turns OFF (cut off), a flywheel diode 31 turns ON, $V_C = -V_{D31}$ (the voltage drop across the diode 31), and the inductive energy stored in the inductor 32 is released to the distributor 14. The capacitor 33 reduces ripples in the output voltage $V_M$ of the DC-DC switching converter 12. The waveform of the output voltage $V_M$ is shown in FIG. 2h.

Thus, the DC-DC switching converter 12 changes the output $V_M$ according to the ON-time ratio of the switching transistor 21. The switching transistor 21 can be held ON when the maximum output is needed.

The operation of this embodiment for controlling the rotational speed is described herein below. At first, the output voltage $V_M$ of the DC-DC switching converter 12 and the current $I_a$ to the polyphase coils 15a, 15b and 15c are zero. Since the rotational speed of the DC motor is zero at the starting period, the output $V_2$ of the speed differentiator 25 is 0.2 V. The differential amplifier 26 amplifies the difference $V_2 - V_1 = 0.2$ V. The output q of the differential amplifier 26 is larger than the triangle-wave p of the oscillator 27. The output w of the comparator 28 is zero. The current amplifier 23 serves the base current $I_{B1}$ to turn the switching transistor 21 ON, while the discharger 24 does not operate. As the DC-DC switching converter 12 increases the output voltage $V_M$, the current $I_a$ to the polyphase coils increases till the voltage drop $V_1$ of the current detector 17 becomes comparable to $V_2$ (this operation is described precisely later). When $V_1 \approx V_2$, that is $I_a \approx 2$ A, the output q of the differential amplifier 26 becomes comparable to the triangle-wave p of the oscillator, and the output w of the switching controller 27 becomes a PWM pulse. The PWM pulse w controls the ON-time ratio of the switching transistor 21, therefore the output voltage $V_M$ of the DC-DC switching converter 12. Thus, the current detector 17, the switching controller 13 and the DC-DC switching converter 12 form a negative feedback loop, for which the output $V_1$ of the current differentiator 17 becomes equal to the output $V_2$ of the speed differentiator 25. So, the current $I_a$ to the polyphase coils 15a, 15b and 15c is propotional to the output $V_2$ of the speed detector 25. That is, $$I_a = (V_2)/(R_{51}) \qquad (7)$$

The distributor 14 distributes the current $I_a$ to the polyphase coils 15a, 15b and 15c according to the relative position between the permanent magnet 16 and the polyphase coils. A continuous torque propotional to the current $I_a$ is generated and it accerelates the DC motor.

When the rotational speed of the DC motor becomes comparable to the desired rotational speed, the output $V_2$ of the speed differentiator 25 decreases from 0.2 V. Then, the DC motor rotates at the desired rotational speed. The current $I_a$ to the polyphase coils 15a, 15b and 15c decreases according to the decrease of $V_2$, and it becomes a small value (about 250 mA) corresponding to the load torque of the DC motor.

As counter electro-motive forces proportional to the rotational speed are generated in the polyphase coils, the output voltage $V_M$ of the DC-DC switching converter 12 is corresponding to the sum of the counter electro-motive force and the voltage drop by the current $I_a$ in the current-fed coil.

Next, the operation for reducing power loss of the switching transistor 21 is described. As the collector current $I_c$ of the switching transistor 21 at the ON-time is equal or nearly equal to the current $I_a$ to the polyphase coils, $I_c$ is 2 A in the starting or accerelating period. Considering that the $h_{FE}$ of the switching transistor is 50 and that the overdrive factor is 2, the base current $I_B$ at the ON-time is at least $(2\text{ A}/50) \times 2 = 80$ mA. From the equations (2), (3) and (4), $i_{11} = 2\text{ A}/1000 = 2$ mA and $I_{12} = 0.1$ mA, then $I_{B1} = 40 \times 2.1 = 84$ mA. So, the switching transistor 21 can be ON (saturated) with the base current of 84 mA.

When the collector current $I_c$ of the switching transistor becomes small (250 mA) in the controlled period, the necessary base current $I_B$ at the ON-time is only $(250\text{ mA}/50) \times 2 = 10$ mA. In this case, $i_{11} = 250/1000 = 0.25$ mA and $I_{12} = 0.1$ mA, then $I_{B1} = 40 \times 0.35 = 14$ mA. So, the switching transistor 21 can be ON with the base current of 14 mA.

Comparing this with the conventional case that the constant base current 84 mA is supplied to the switching transistor 21, the power loss of the embodiment is remarkably reduced. The reduced power is $(84-14)\text{mA} \times 20\text{ V} \times 0.35 = 0.49$ W, when the ON-time ratio is 0.35. As $V_M \approx 20\text{ V} \times 0.35 = 7$ V, the output power of the DC-DC switching converter 12 is 7 V$\times 250$ mA$=1.75$ W. Therefore, the power efficiency of the embodiment is remarkably improved. Further, the range of the output voltage $V_M$ of the DC-DC switching converter 12 is wide, as the switching transistor 21 can be held ON. So, the embodiment shown in FIG. 1 is suitable for a DC motor with a wide range of outputs in rotational speed or torque.

The operation of the switching transistor 21 at the initial transient period is described herein below. As the initial base current of the switching transistor 21 is only propotional to the constant current $I_{12}$ when $V_M = 0$ and $I_a = 0$, the switching transistor 21 can not be ON (saturated), but it operates in the active region as a current amplifier. Thus, $I_{B1} = 40 \times 0.1 = 4$ mA and $I_c = 50 \times 4 = 200$ mA. Then, $I_a$ becomes equal to $I_c$, and $V_1 = 0.1\Omega \times 200$ mA $= 20$ mV. So, $i_{11} = 20$ mV$/1000 = 0.02$ mA and $i_{13} = 0.12$ mA. Then, $I_{B1} = 4.8$ mA and $I_c = 240$ mA, - - - .

The current detector 17, the current supplier 18, the current amplifier 23 and the switching transistor 21 form a positive feedback loop. The output voltage $V_M$ of the DC-DC switching converter 12 and the current $I_a$ to the polyphase coils increase according to the increase of the current $I_c$ of the switching transistor 21. The output current $i_{13}$ of the current supplier 18 increases according to the increase of the current $I_a$, and the base current $I_{B1}$ and the collector current $I_c$ of the switching transistor 21 increase according to the increase of the current $i_{13}$. Finally, the switching transistor 21 becomes ON (saturated). The transient time of this positive feedback is less than 10 msec, short enough to make no influence to the accerelating characteristic of the DC motor (usual accerelation time is about 2 sec).

After this transient, the switching transistor 21 operates normally and switches ON or OFF according to the output w of the switching controller 13.

The next conditions are necessary to operate the switching transistor 21 normally and to reduce the power loss caused by the base current of the switching transistor 21.

<condition A> A small current is supplied to the base of the switching transistor 21 at the ON-time, whenever the current $I_a$ to the polyphase coils is zero. For the sake of $I_{12}$ (0.1 mA), the switching transistor 21 becomes active at the first time.

<condition B> Assuming that the gain from the current $I_a$ to the current $i_{13}$ of the current supplier 18 is $A_1$ ($A_1 = R_{51}/R_{55}$), that the gain from the current $i_{13}$ to the output $I_{B1}$ of the current amplifier 23 is $A_2$ ($A_2 = R_{36}/R_{39}$), and that the current gain of the switching transistor 21 is $A_3$ ($A_3 = h_{FE}$), the product $A_1 \cdot A_2 \cdot A_3$ is not less than 1. Preferably, $A_1 \cdot A_2 \cdot A_3$ is equal to the overdrive factor 2 of of the switching transistor 21. But, as the current gain $A_3$ varies greatly, $A_1 \cdot A_2 \cdot (A_3)min \geq 1$ is necessary for maintaining the positive feedback loop normally, where $(A_3)min$ is the minimum value of the current gain $A_3$.

The effect of the discharger 24 for reducing storage time of the switching transistor 21 is explained herein below. Though the switching transistor 21 switches according to the output w of the switching controller 13, the charge stored between the base and emitter of the switching transistor 21 during the ON-time produces the strage time $t_s$. The switching transistor 21 remains ON in the storage time $t_s$ after the base current $I_{B1}$ becomes zero.

Considering that the discharger 24 is deleted in the embodiment of FIG. 1, the storage time $t_s$ becomes very large, about 5 μsec. This is harmful to control the DC motor at low rotational speeds, because the ON-time ratio of the switching transistor 21 can not be controlled below 5 μsec/10 μsec=0.5 (10 μsec is one cyclic time). So, the switching frequency of the switching transistor 21 has to be reduced considerably by about 1/5. The decrease of the switching frequency causes the increase of the sizes of the inductor 32 and the capacitor 33 for reducing ripples of the output voltage $V_M$ of the DC-DC switching converter 12. This is a great handicap when the embodiment of FIG. 1 is used as a control system for a capstan motor in a portable audio or video cassette tape recorder.

The conventional way for reducing the storage time is to connect a resistor with the resistance value 1 KΩ between the base and emitter of the switching transistor 21. But it is not enough to shorten the storage time. On the other hand, the discharger 24 shown in FIG. 1 discharges the base-emitter charge rapidly by a discharge current about 5 mA, and it reduces the storage time remarkably (about 1 μsec). Thus, the ON-time ratio of the switching transistor 21 can be controlled from 0.1 to 1 continuously, even if the switching frequency is 100 KHz. The storage time of the output transistor 48 of the discharger 24 is very small, because the transistors 46 and 48 and the resistors 47 and 49 form the current mirror. The dynamic resistance between the base and emitter of the transistor 48 is about 150 Ω, and the base-emitter charge of the transistor 48 discharges rapidly through the small dynamic resistance.

As the discharger 24 and the current amplifier 23 operate complementary, the current amplifier 23 has received no influence from the discharger 24. The switching transistor 21 turns ON to OFF or OFF to ON sharply according to the output w of the switching controller 13. The discharger 24 also reduces fall time of the switching transistor 21, and the decrease of the fall time decreases a power loss of the switching transistor 21 at the switching transient time, which is called as switching loss.

The current detector 17, the current supplier 18, the current amplifier 23 and the discharger 24 are constructed only by resistors, transistors, diodes and current sources. Therefore, these blocks are easy to fabricate on a silicon chip by monolithic integrated circuit technology. This reduces a circuit space of the embodiment.

Figure 3:
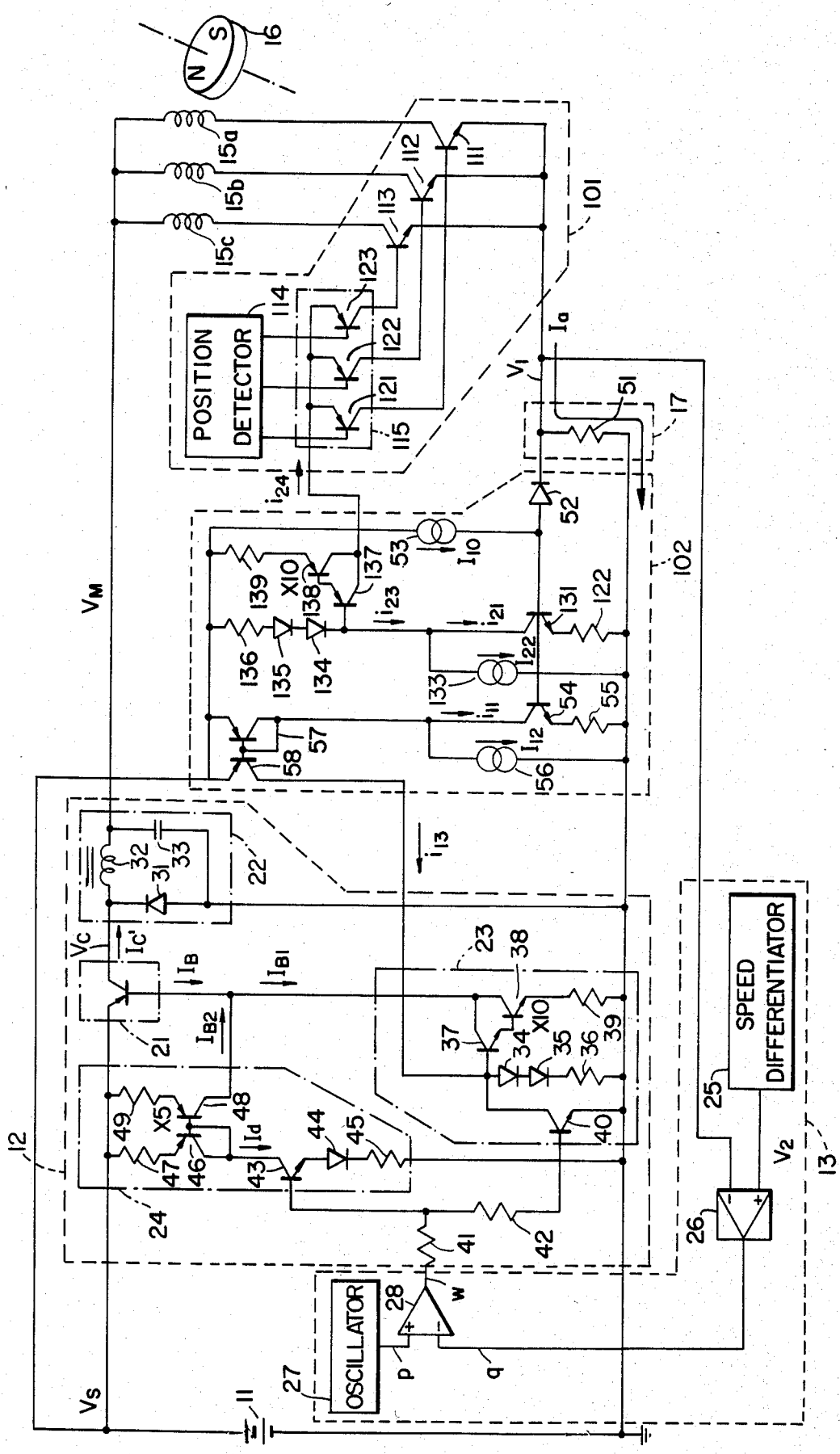
FIG. 3 is a circuit diagram of another embodiment of a drive system for a DC motor, which is suitable for a brushless DC motor.

Next, a drive system suitable for a brushless DC motor according to the present invention is described. FIG. 3 shows the embodiment of the drive system. The DC voltage source 11, the DC-DC switching converter 12, the switching controller 13, the polyphase coils 15a, 15b and 15c, the permanent magnet 16, and the current detector 17 are the same as those shown in FIG. 1, so the numerals are the same and the explanation is abbreviated.

The distributor 101 comprises output transistors 111, 112 and 113, a position detector 114 for generating output signals corresponding to the relative position between the permanent magnet 16 and the polyphase coils 15a, 15b and 15c, and a selector for activating the output transistors 111, 112 and 113 selectively according to the output signals of the position detector 114. In a brushless DC motor, the permanent magnet 16 is affixed to the rotor, while the polyphase coils 15a, 15b and 15c are affixed to the stator.

The current supplier 102 produces the currents $i_{11}$ and $i_{21}$ propotional to the current $I_a$ to the polyphase coils 15a, 15b and 15c. The current $i_{11}$ is the same as that of the embodiment shown in FIG. 1, and it is represented by the equation (2). The current $i_{21}$ is, $$i_{21} \approx (R_{51}/R_{132}) \cdot I_a \qquad (8)$$

where $R_{132}$ is the resistance value of the resistor 132. $R_{132}=100$ Ω, and $i_{21}=I_a/1000$. The current $i_{11}$ is added to the current $I_{12}$ of the constant current source 56, and the added current is supplied to the current amplifier 23 of the DC-DC switching converter 12 through the current mirror circuit (transistor 57 and 58). Thus, $i_{13}=i_{11}+I_{12}$.

The current $i_{21}$ is added to the current $I_{22}$ ($I_{22}=0.1$ mA) of a constant current source 133. That is, $$i_{23} = i_{21} + I_{22} \qquad (9)$$

The added current $i_{23}$ is supplied to the selector 115 of the distributor 101 through a current amplifier formed by diodes 134 and 135, transistors 137 and 138 and resistors 136 and 139. Because the base-emitter voltage of the composite transistor (transistors 137 and 138) is equal or nearly equal to the voltage drop across the diodes 134 and 135, the voltage drop across the resistor 139 is equal or nearly equal to the voltage drop across the resistor 136. Thus, the output current $i_{24}$ of the current amplifier is, $$i_{24} \approx (R_{136}/R_{139}) \cdot i_{23} \qquad (10)$$

where $R_{136}$ and $R_{139}$ are the resistance values of the resistors 136 and 139, respectively. In this case, $R_{136}/R_{139}=20$.

The operation for controlling the rotational speed of the DC motor and the operation for reducing the power loss caused by the base current of the switching transistor 21 are the same as those of the embodiment shown in FIG. 1. Thus, the explanation of these operations are omitted.

The embodiment shown in FIG. 3 has another advantage of reducing a power loss caused by the base currents of the output transistors 111, 112 and 113. This is explained below.

The transistors 121, 122 and 123 of the selector 115 operate differentially and distribute a common emitter current to the collector currents according to the output signals of the position detector 114. The collector currents of the transistors 121, 122 and 123 are the base currents of the output transistors 111, 112 and 113, respectively. Thus, the output transistor 111, 112 and 113 switch from ON (saturated) to OFF (cut off) or from OFF to ON and distribute the current $I_a$ to the polyphase coils 15a, 15b and 15c according to the output signals of the position detector 114.

The common emitter current of the selector 115 is the current $i_{24}$ supplied from the current supplier 102.

Considering that the transistor 121 is active and the rest of the transistors 122 and 123 are cut off, the output transistor 111 is ON with the base current $i_{24}$ and the rest of the output transistors 112 and 113 are OFF. Assuming that the current gain of the output transistor is 60 and the overdrive factor is 1.2, the base current of the output transistor is at least $(2 A/60) \times 1.2 = 40$ mA at the starting or accelarating period of the DC motor for supplying the selected polyphase coil 15a with the current $I_a = 2$ A. From the equations (8), (9) and (10), $i_{21} = 2$ A/1000 = 2 mA and $I_{22} = 0.1$ mA, then $i_{23} = 2.1$ mA and $i_{24} = 20 \times 2.1$ mA = 42 mA. So, the output transistor 111 can be ON with the base current of 42 mA.

When the current $I_a$ to the polyphase coils becomes small (250 mA) in the controlled period, the necessary base current of the output transistor 111 is only (250 mA/60) $\times 1.2 = 5$ mA. In this case, $i_{21} = 250/1000 = 0.25$ mA and $I_{22} = 0.1$ mA, then $i_{23} = 0.35$ mA and $i_{24} = 20 \times 0.35 = 7$ mA. So, the output transistor 111 can be ON with the base current of 7 mA.

Comparing this with the conventional case where a constant base current of 42 mA is supplied to the output transistor, the power loss corresponding to the base current is remarkably reduced. The reduced power is $(42 - 7)$ mA $\times 20$ V = 0.7 W. Therefore, the power efficiency of the embodiment is further improved.

As the initial base current of the selected output transistor is only propotional to the current $I_{22}$ when $V_M = 0$ and $I_a = 0$, the output transistor can not be ON (saturated), but it operates in the active region as a current amplifier. Thus, $i_{24} = 20 \times 0.1 = 2$ mA and $I_a = 61 \times 2$ mA = 122 mA. Then, $V_1 = 0.1\Omega \times 122$ mA = 12.2 mV. So, $i_{21} = 12.2/1000 = 0.0122$ mA and $i_{23} = 0.1122$ mA. Then, $i_{24} = 2.244$ mA and $I_a = 136.884$ mA.

The current detector 17, the current supplier 102, the selector 115 and the output transistors 111, 112 and 113 form another positive feedback loop.

The output current $i_{24}$ of the current supplier 102 increases according to the increase of the current $I_a$, and the current $I_a$ increases according to the increase of the output current $i_{24}$ of the current supplier 102.

Finally, the selected output transistor becomes ON (saturated). The transient time of this positive feedback loop is very short because no time delay element is introduced in the positive feedback loop. Thus, there is no influence on the accelerating characteristics of the DC motor. After this transient, the selected output transistor operates normally and the output transistors 111, 112 and 113 switch from ON to OFF or from OFF to ON according to the output signals of the position detector 114.

The next conditions are necessary to operate the output transistors normally and to reduce the power loss caused by the base currents of the output transistors.

< condition C > A small current is supplied to the base of the selected output transistor, whenever the current $I_a$ to the polyphase coils is zero. For the sake of $I_{22}$ (0.1 mA), the selected output transistor becomes active at the first time.

< condition D > Assuming that the gain from the current $I_a$ to the output current $i_{24}$ of the current supplier 102 is $D_1$ ($D_1 = (R_{51} \cdot R_{136})/(R_{132} \cdot R_{139})$), and that the current gains of the output transistors are equal to $D_2$ ($D_2 = h_{FE}$), the product $D_1 \cdot D_2$ is not less than 1. Preferably, $D_1 D_2$ is equal to the overdrive factor 1.2 of the output transistors. But, as the current gain $D_2$ varies greatly, $D_1(D_2)min \geq 1$ is necessary for maintaining the positive feedback loop normally, where $(D_2)min$ is the minimum value of the current gain $D_2$.

The current detector 17 detects the emitter currents of the output transistors 111, 112 and 113 in the embodiment of FIG. 3. In this case, the base currents of the output transistors are included in the current $I_a$, thus the additional condition is necessary to reduce the error caused by the base currents.

< condition E > As the gain from the current $I_a$ to the base current of the selected output transistor is $D_1$, $D_1$ is much less than 1, usually $D_1 \leq 1/10$. In the case of the embodiment of FIG. 3, $D_1 = 20/1000 = 1/50$.

The embodiment of FIG. 3 has two positive feedback loops and one negative feedback loop except for the rotational speed control loop. As the two positive feedback loops work instantly, the switching transistor 21 and the output transistor 111, 112 or 113 operate either ON or OFF after the short transient time. Thus, the two positive feedback loops have no influence on the negative feedback loop after the above-noted transient time, and the rotational speed of the DC motor is controlled precisely.

Therefore, a drive system for a rotary type DC motor or a linear type DC motor according to the invention has a high power efficiency, which is especially suitable to a portable audio or video cassette tape recorder.

Although the description of the embodiments is directed to a DC motor having three phase coils, it should be understood that this invention can be applied to any number of phase coils.

Besides, the distributor is not limited by the previous embodiments. For example, the distributor shown in FIG. 6 in the U.S. Pat. No. 4,359,674 is usable for distributing a current to polyphase coils in the embodiment shown in FIG. 1 or FIG. 3. Further, this invention can be also applied to a brushless DC motor for supplying a current to polyphase coils bidirectionally (for example, the electronic control apparatus in the U.S. Pat. No. 4,035,700).

What is claimed is:

1. A drive system for a DC motor comprising:
   a permanent magnet having a plurality of N and S poles;
   polyphase coils provided in the magnetic field of said permanent magnet so as to produce a force by interaction between magnetic flux of said permanent magnet and a current to said polyphase coils;
   a DC voltage source for supplying an electrical power;

a distributor having a plurality of output transistors for distributing the electrical power of said DC voltage source to said polyphase coils, a position detector for generating output signals corresponding to the relative position between said permanent magnet and said polyphase coils, and a selector for activating said output transistors selectively according to the output signals of said position detector;

a current detector for detecting the current to said polyphase coils; and a current supplier for supplying said distributor with a current corresponding to the detected signal of said current detector so that the base current of said output transistor at the ON period changes corresponding to the current to said polyphase coils;

wherein the base current of said output transistor during the ON period has two parts; one part is proportional to the current to said polyphase coils, and the other part is a constant which is greater than zero.

2. A drive system for a DC motor comprising:

a permanent magnet having a plurality of N and S poles;

polyphase coils provided in the magnetic field of said permanent magnet so as to produce a force by interaction between magnetic flux of said permanent magnet and a current to said polyphase coils;

a DC voltage source for supplying an electrical power;

a DC-DC switching converter having a switching transistor for chopping the voltage of said DC voltage source, a filter for smoothing an output voltage of said switching transistor, and a current amplifier for supplying said switching transistor with a base current pulse having a magnitude proportional to an input current;

a switching controller for controlling the operation of said current amplifier for making the base current pulse of said switching transistor;

a distributor for distributing an output of said DC-DC switching converter to said polyphase coils according to the relative position between said permanent magnet and said polyphase coils;

a current detector for detecting the current to said polyphase coils; and a current supplier for supplying said current amplifier with an input current corresponding to the detected signal of said current detector so that the base current of said switching transistor at the ON-time changes corresponding to the current to said polyphase coils.

3. A drive system for a DC motor according to claim 2, wherein said DC-DC switching converter further has a discharger for discharging rapidly the base-emitter charge of said switching transistor at the OFF-time, and said current amplifier and said discharger operate complementally according to the output signal of said switching controller.

4. A drive system for a DC motor according to claim 3, wherein said discharger has a current source for producing a current pulse according to the output signal of said switching controller and a current mirror amplifier for discharging the base-emitter charge of said switching transistor according to the current pulse of said current source, and the output transistor of said current mirror amplifier makes a short circuit between the base and emitter of said switching transistor.

5. A drive system for a DC motor according to claim 2, wherein said switching controller has a speed differentiator for producing an output corresponding to the difference between the rotational speed of the DC motor and a desired rotational speed, a differential amplifier for amplifying the difference between the output of said current detector, an oscillator for generating a triangle-wave signal, and a comparator for comparing the difference between the output of said differential amplifier and the triangle-wave signal of said oscillator so that the output of said comparator controls the ON-time ratio of said switching transistor.

6. A drive system for a DC motor according to claim 2, wherein the base current of said switching transistor has two parts: the one is proportional to the current to said polyphase coils, and the other is a constant larger than zero.

7. A drive system for a DC motor according to claim 2, wherein said distributor has a plurality of output transistors, a position detector for generating output signals corresponding to the relative position between said permanent magnet and said polyphase coils and a selector for activating said output transistors selectively according to the output signals of said position detector.

8. A drive sysem for a DC motor according to claim 7, wherein said current supplier supplies said distributor with another current corresponding to the detected signal of said current detector so that the base current of said output transistor at the ON period changes corresponding to the current to said polyphase coils.

9. A drive system for a DC motor according to claim 8, wherein the base current of said output transistor at the ON period has two parts, one is proportional to the current to said polyphase coils, and the other is a constant larger than zero.

10. A drive system for a DC motor comprising:

a permanent magnet having a plurality of N and S poles;

polyphase coils provided in the magnetic field of said permanent magnet so as to produce a force by interaction between magnetic flux of said permanent magnet and a current to said polyphase coils;

a DC voltage source for supplying an electrical power;

a DC-DC switching converter having a switching transistor for chopping the voltage of said DC voltage source, a filter for smoothing an output voltage of said switching transistor, and a current amplifier for supplying said switching transistor with a base current pulse;

a switching controller for controlling the operation of said current amplifier for making the base current pulse of said switching transistor;

a distributor having a plurality of output transistors for distributing an output of said DC-DC switching converter to said polyphase coils, a position detector for generating output signals corresponding to the relative position between said permanent magnet and said polyphase coils, and a selector for activating said output transistors selectively according to the output signals of said position detector;

a current detector for detecting the current to said polyphase coils; and a current supplier for supplying said distributor with a current corresponding to the detected signal of said current detector so that the base current of said output transistor at the ON period changes corresponding to the current to said polyphase coils.

11. A drive system for a DC motor according to claim 10, wherein the base current of said output transistor at the ON period has two parts: one is proportional to the current to said polyphase coils, and the other is a constant larger than zero.

12. A drive system for a DC motor according to claim 10, wherein said DC-DC switching converter further has a discharger for discharging rapidly the base-emitter charge of said switching transistor at the OFF-time, and said current amplifier and said discharger operate complementally according to the output signal of said switching controller.

13. A drive system for a DC motor according to claim 12, wherein said discharger has a current source for producing a current pulse according to the output signal of said switching controller and a current mirror amplifier for discharging the base-emitter charge of said switching transistor according to the current pulse of said current source, and the output transistor of said current mirror amplifier makes a short circuit between the base and emitter of said switching transistor.

14. A drive system for a DC motor according to claim 10, wherein said current supplier supplies said current amplifier with another current corresponding to the detected signal of said current detector so that the base current of said switching transistor at the ON-time changes corresponding to the current to said polyphase coils.

15. A drive system for a DC motor according to claim 14, wherein the base current of said switching transistor has two parts: the one is proportional to the current to said polyphase coils, and the other is a constant larger than zero.

16. A DC-DC switching converter unit usable for a drive system for a DC motor comprising:
- a switching transistor for chopping a voltage of a DC voltage source;
- a filter for smoothing an output voltage of said switching transitor and for supplying a load with a DC voltage;
- a current amplifier for supplying said switching transistor with a base current pulse;
- a switching controller to controlling the operation of said current amplifier for making the base current pulse of said switching transistor;
- a current detector for providing a DC output signal corresponding to the DC current flowing through said load; and
- a current supplier for supplying said current amplifier with a current corresponding to the output signal of said current detector so that the base current of said switching transistor at the ON-time changes corresponding to the current flowing through said load and said switching transistor can be held ON when the maximum output is needed.

17. A DC-DC switching converter unit according to claim 16, wherein the base current of said switching transistor has two parts; one is proportional to the current flowing through said load, and the other is a constant larger than zero.

18. A DC-DC switching converter unit according to claim 16, wherein said DC-DC switching converter further has a discharger for discharging rapidly the base-emitter charge of said switching transistor at the OFF-time, and said current amplifier and said discharger operate complementally according to the output signal of said switching controller.

19. A DC-DC switching converter unit according to claim 18, wherein said discharger has a current source for producing a current pulse according to the output signal of said switching controller and a current mirror amplifier for discharging the base-emitter charge of said switching transistor according to the current pulse of said current source, and the output transistor of said current mirror amplifier makes a short circuit between the base and emitter of said switching transistor.

20. A DC-DC switching converter unit usable for a drive system for a DC motor comprising:
- a switching transistor for chopping a voltage of a DC voltage source;
- a filter for smoothing an output voltage of said switching transitor and for supplying a load with a DC voltage;
- a current amplifier for supplying said switching transistor with a base current pulse;
- a switching controller for controlling the operation of said current amplifier for making the base current pulse of said switching transistor; and
- a discharger for discharging rapidly the base-emitter charge of said switching transistor at the OFF-time,
- wherein said discharger has a current source for producing a current pulse according to the output signal of said switching controller and a current mirror amplifier for discharging the base-emitter charge of said switching transistor according to the current pulse of said current source, and the output transistor of said current mirror amplifier makes a short circuit between the base and emitter of said switching transistor.

* * * * *